May 1, 1956 C. E. EADON-CLARKE 2,743,771
GAS BURNER SYSTEM HAVING TIME CONTROLLED
AIR AND FUEL SUPPLY
Filed Sept. 18, 1951 2 Sheets-Sheet 1

Inventor
C. E. LADON-CLARKE
By R P Morris
Attorney

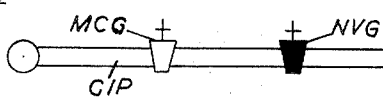
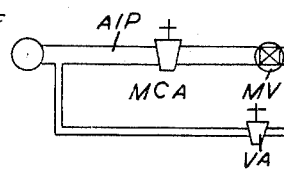
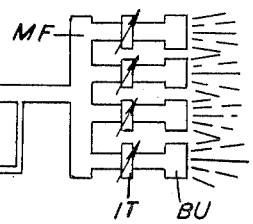
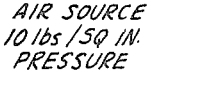
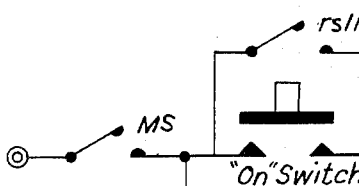

United States Patent Office 2,743,771  
Patented May 1, 1956

2,743,771

GAS BURNER SYSTEM HAVING TIME CONTROLLED AIR AND FUEL SUPPLY

Christopher Erskine Eadon-Clarke, London, England, assignor to International Standard Electric Corporation, New York, N. Y., a corporation of Delaware Application September 18, 1951, Serial No. 247,173

Claims priority, application Great Britain September 22, 1950

2 Claims. (Cl. 158—123)

This invention relates to industrial gas-heating equipment and particularly to control means for such equipment.

Such equipment is used for processes such as brazing, soldering, welding and annealing each of which requires some measure of skill on the part of an operator. The gas used may be town coal-gas mixed with air, or oxy-acetylene or the like mixtures.

A feature of the invention provides for the use, in combination, of town gas, compressed air and means to control the supply of a mixture of gas and air to a burner or burners which are fully operative only for some predetermined period.

This and other features of the invention will become apparent from the following description of one embodiment of the invention shown in the drawings accompanying the provisional specification in which.

Fig. 4 and 5 of the accompanying drawings show two methods for avoiding flashes from the burners caused by the sudden expulsion of pure gas from the manifold after a period of idling and Fig. 6 shows schematically a control circuit for the air/gas arrangement of Fig. 5.

The efficient combustion of a gas depends largely on mixing it with a correct proportion of air before it is fed to a burner.

Broadly two alternative methods have been proposed whereby either low pressure gas is fed through a small jet and air is sucked in, as in Bunsen burner, or low pressure gas and compressed air mixed near the burner as in the well-known blow-torch.

A third method might use gas at an enhanced pressure but if the gas is town gas, large and expensive gas pressure booster would have to be employed. The latter is, however, unsatisfactory as boosters are not designed to have their output suddenly switched on and off.

The above mentioned processes usually require rapid heating and efficiency of combustion is one means to this end. Efficiency of combustion depends on complete combustion of the gas by good mixing before burning with the correct proportion of air. Rapid heating further depends on the emergence of burnt gas at high velocity to impinge on the area under treatment to keep the heating as local as possible. The design of the burner is of importance here in order that the flame does not blow off the jets due to the high injection speed of the air/gas mixture.

Figure 1:
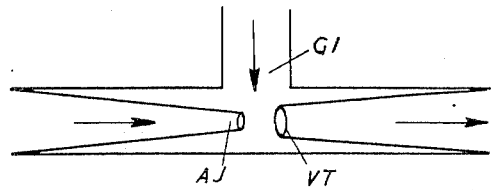
Fig. 1 shows a form of injector used in the invention.

The second of the two main alternatives discussed above has been adopted for use in the present invention and the injection unit shown in Fig. 1 is supplied with compressed air via the nozzle AJ and gas is drawn in at GI. The compressed air is at about 10 lbs./sq. in. pressure such as is normally "on top" in most factory workshops and the gas coming from the main is at approximately 2 inches W. G. pressure.

The gas is led in and generally fills the body of the injector. The mixture leaves via a venturi tube VT whose orifice is larger, by a factor of 1.31, than the compressed air is turned on the gas is drawn from the main at about 18 inches pressure instead of its normal 2 inches.

Figure 2:
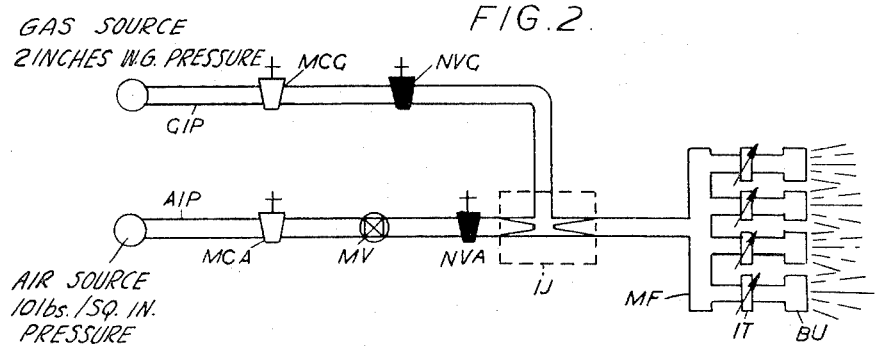
Fig. 2 shows a gas/air "circuit" comprising the mixing and controlled features of the equipment.

The air/gas "circuit" is shown in Fig. 2, the gas and air intake pipes being GIP and AIP respectively. These supplies are each provided with main "on/off" cocks MCG, MCA and needle regulating valves NVG, NVA by which the relative flow of air and gas can be initially adjusted and locked in a set position for a particular number of burners or for a particular job.

An electro-magnetically operated valve MV is situated in the compressed air line so that the air supply can be switched on or off by push button control. The pipes GIP, AIP feed gas and air to an injector IJ of the type shown in Fig. 1, which in turn feeds gas/air mixture to a burner manifold MF carrying a desired number of burners BU. These burners may be of any type, e. g., fish tail or needle jets known as "pin-fires." Each burner may, if desired be provided with its own manual tap IT.

Figure 3:
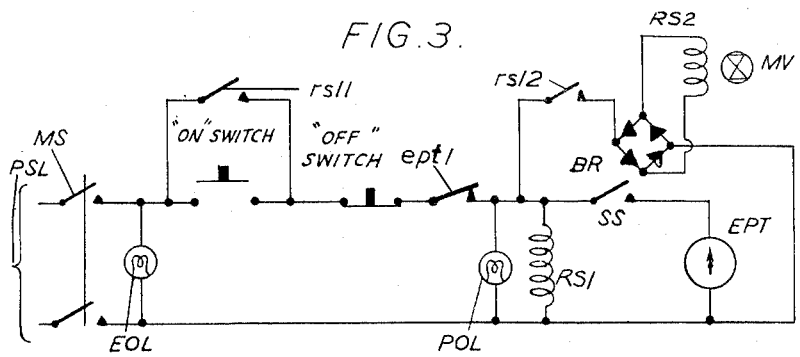
Fig. 3 shows an electrical circuit suitable for controlling the operations performed by the equipment.

The electro-magnetically operated valve MV having a coil RS2 is controlled by a circuit as shown in Fig. 3. In the example taken an A. C. mains supply is assumed; the magnetic valve is D. C. operated and a bridge rectifier BR has been included to provide its supply. Obviously an A. C. operated magnetic valve would make the use of rectifiers unnecessary.

The power supply leads PSL contain a main switch MS, and indicator lamp EOL which is lit when the main switch is closed. The two buttons, "on" switch, "off" switch and the coil RS1 and its associated contacts rs11 and rs12 form a well-known starter circuit whereby pressing and releasing of the "on" button causes coil RS1 to pull-in contacts rs11 and rs12 which are then held-in by a circuit through contact rs11 until the circuit is opened by the normally-closed "off" button.

A second indicator lamp POL shows the equipment to be on when lit since the contact ept1 controlled by the process timer EPT is normally closed. A manually operated switch SS is placed in series with the process timer EPT so that, if desired, the process may be continued independently of the period set by the process timer.

The timer EPT may be of any known type adapted to open contacts ept1 after a predetermined time interval.

The operation of the equipment is as follows: The main gas and air cocks MCG, MCA (Fig. 2) are opened, it being assumed that the settings of the needle valves NVG, NVA have been previously found for a given number of burners. The taps IT, if provided, are opened and the burners lit. Due to the low pressure of the gas supply the flames are quite small and may be left as pilots when the equipment is idling. The main switch MS (Fig. 3) is closed and the indicator lamp EOL shows the equipment to be connected to the A. C. main. Upon depressing the "on" switch the contactor coil RS1 is energised over normally closed contacts ept1 of the timer EPT, contacts rs11 and rs12 close, the former to hold-in the contactor coil RS1 and the latter to close an obvious circuit over coil RS2 to operate the magnetically operated valve MV. If the switch SS is already closed a circuit is completed for the process timer EPT which commences to time the duration of the heating cycle. While valve MV is open, compressed air is forced through the injector IJ (Fig. 2) and gas is drawn in from the main at about 18 inches W. G. pressure and the mixture of gas and air delivered to the burners which, ceasing to burn with pilot flames, change over to intense flames which almost instantaneously attain their optimum temperature.

At the end of the period for which the process timer is set the contacts ept1 are automatically opened and current ceases to flow in the magnetically operated valve MV, the contactor coil RS1 and process timer circuits. The valve MV immediately closes, cutting off the compressed air supply to the injector so that within a moment the burners revert to the pilot light condition. The contactor coil RS1 is de-energized whereupon contacts rs11 and rs12 open so that the process timer may be reset without restarting the heating cycle.

The switch SS can be opened and closed to give manual extension of the total period for which the process timer has been set. This period may of course be infinite if the process timer has a setting for continuous operation or provision made for releasing the timer from service by short-circuiting its controlled contact ept1. The valve MV under these conditions is then under the control of the "on" and "off" switches.

Fig. 4 shows a modification of the gas/air circuit in which a by-pass with its own control valve VA has been added. This by-pass prevents the injector, feed-pipe and manifold from completely filling with gas when the equipment is idling by permitting a small quantity of compressed air to pass the valve MA. This is to prevent in turn a large gaseous flame to appear at the burners at the instant when compressed air is admitted to the injector. This "flare" is due to the sudden expulsion of pure gas which fills the manifold, feed-pipe and injector by the pressure exerted behind it when the compressed air is switched on.

The above arrangement has an objection in that the by-pass upsets the ratio of the mixture as provided by the injector when the main (mixture) supply is flowing into the manifold since the pilot air supply is then in parallel with the main supply. To overcome this objection the arrangement of Fig. 5 has been developed in which the gas/air circuit is now "balanced" since electrically operated valves MVA and MVG are provided in both the main gas and air supplies and each has a by-pass controlled by a needle valve; B in the case of the gas supply and D in the case of the air supply. It will be seen that the pilot pipes are taken into the main circuit prior to the injector instead of after it as in Fig. 4 and thus settings of the valves B, C, D and E can be found which, while satisfactory pilot flames can be obtained when the equipment is idling, do not affect the provision of an efficient mixture when the equipment is "on."

Another arrangement not shown which also allows a small flow of gas and air past their respective electrically controlled valves for the provision of a pilot supply for the burners uses adjusting screws on the electro-magnetically operated valve MVA, Figs. 2 and 4, or valves MVA and MVG, Fig. 5 which permit the valves to remain very slightly open when in the "closed" condition. The adjusting screw just mentioned gives the same control as for instance the needle-valves B and D of Fig. 5.

Fig. 6 is an electrical control circuit differing from Fig. 3 only in that two coils RS3 and RS4 are provided, the former for the operation of the additional valve MVG in Fig. 5, and A. C. electro-magnets avoid the use of the rectifier BR in Fig. 3, for supplying D. C. operated magnet coils.

While the principles of the invention have been described above in connection with specific embodiments and particular modifications thereof, it is to be clearly understood that this description is made by way of example and not as a limitation on the scope of the invention which is defined by the following claims.

What I claim is:

1. Heating equipment for metal working comprising a gas burner, a low pressure gas source, a relatively high pressure compressed air source, an injector for mixing said gas and air having a separate air inlet, a separate gas inlet and common outlet for the mixture, a pipeline connecting said air source to said air inlet, a pipeline connecting said gas source to said gas inlet and a pipeline connecting said outlet to said burner, said air inlet and said common outlet forming two parts of a Venturi tube so arranged within the body of said injector that fast moving air passing from one part of the Venturi tube to the other draws gas into the injector and imparts thereto a pressure greater than that at which said gas is supplied from the gas source, a shut-off valve in said pipeline connecting said air source to said inlet, a switch having circuit closing contacts, electromagnetic means for actuating said shut-off valve, electrically operated timing means, contacts operated by said timing means, a circuit for said timing means including said switch contacts, a circuit for controlling the energization of said electro-magnetic means including said switch contacts and the contacts operated by said timing means, and an adjustable valve in said pipeline connecting said gas source to said gas inlet for providing a pilot flame for said burner when said shut-off valve is closed.

2. Heating equipment for metal working comprising a gas burner, a low pressure gas source, a relative high pressure compressed air source, an injector for mixing said gas and air having a separate air inlet, a separate gas inlet and a common outlet for the mixture, a pipeline connecting said air source to said air inlet, a pipeline connecting said gas source to said gas inlet and a pipeline connecting said outlet to said burner, said air inlet and said common outlet forming two parts of a Venturi tube so arranged within the body of said injector that fast moving air passing from one part of the Venturi tube to the other draws gas into the injector and imparts thereto a pressure greater than that at which said gas is supplied from the gas source, a first shut-off valve in said pipeline connecting said air source to said air inlet, a second shut-off valve in said pipeline connecting said gas source to said gas inlet, a switch having circuit closing contacts, first electro-magnetic means for actuating said first shut-off valve, second electro-magnetic means for actuating said second shut-off valve, electrically operating timing means, contacts operated by said timing means, a circuit for said timing means including said switch contacts, a circuit for controlling the energization of said first and second electro-magnetic means including said switch contacts and the contacts operated by said timing means, a by-pass pipeline around said second shut-off valve and an adjustable valve in said by-pass pipeline for providing a pilot flame for said burner when said second shut-off valve is closed.

References Cited in the file of this patent

UNITED STATES PATENTS

| 1,710,839 | Peebles | Apr. 30, 1929 |
|---|---|---|
| 1,834,130 | McKee | Dec. 1, 1931 |
| 1,916,983 | McKee | July 4, 1933 |
| 2,147,568 | Barber | Feb. 14, 1939 |
| 2,311,061 | Lutherer | Feb. 16, 1943 |

FOREIGN PATENTS

| 610,672 | Great Britain | Oct. 19, 1948 |